Nov. 13, 1951     J. F. SCHEIDT     2,574,846
FISH STRINGING DEVICE
Filed Oct. 27, 1947
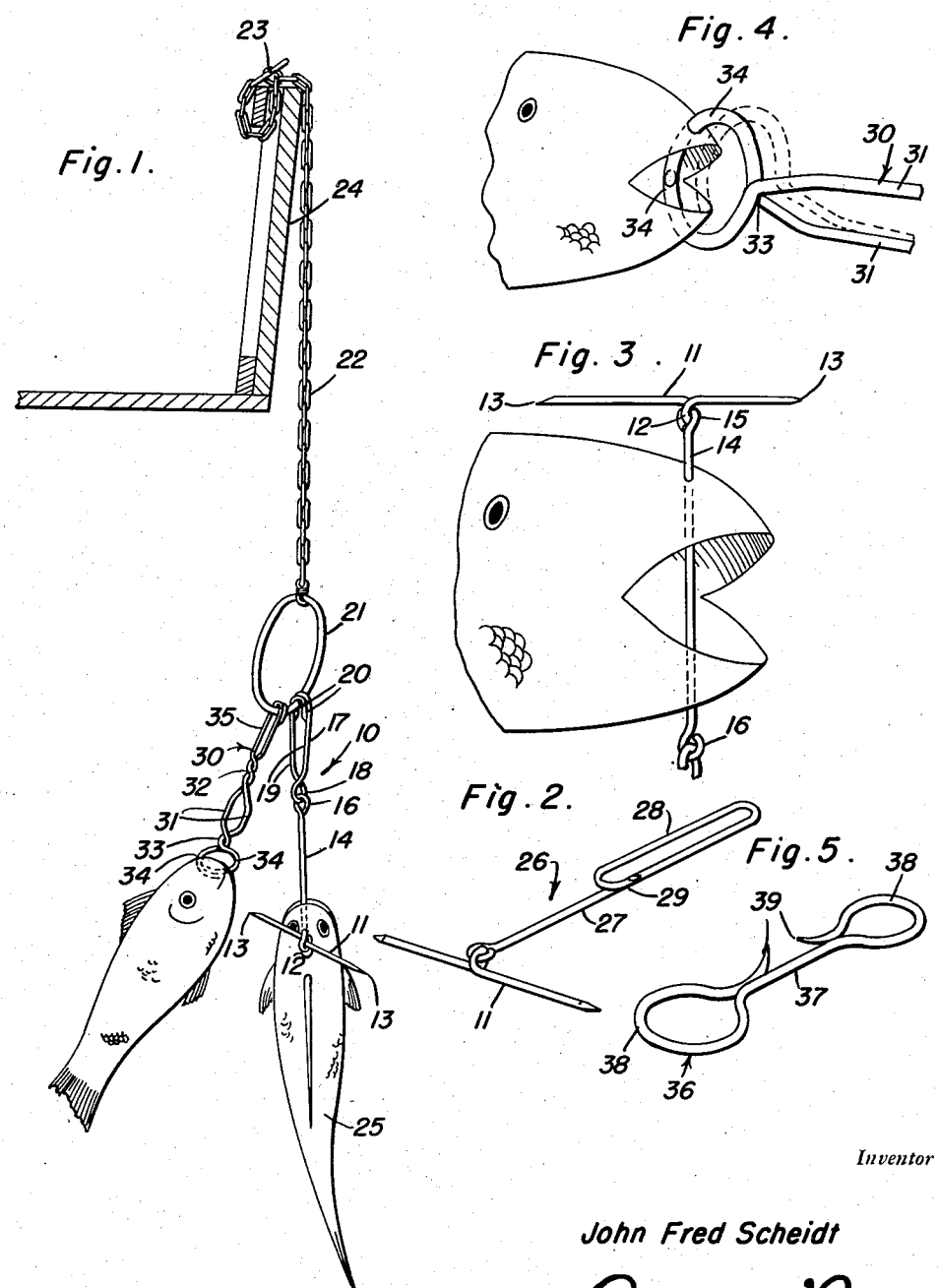
Inventor
John Fred Scheidt
By *Clarence A. O'Brien and Harvey B. Jacobson*
                               Attorneys Patented Nov. 13, 1951

2,574,846

UNITED STATES PATENT OFFICE 2,574,846

FISH STRINGING DEVICE

John Fred Scheidt, Moorhead, Minn.

Application October 27, 1947, Serial No. 782,430

1 Claim. (Cl. 224—7)

This invention relates to new and useful improvements and structural refinements in fish stringing devices, and the principal object of the invention is to provide a device of the character herein described, such as may be easily and conveniently employed for securing fish to a dock, side of a boat, or the like, after they have been removed from the fishing line.

A further object of the invention is to provide a fish stringing device which is particularly adapted to maintain the fish alive for a considerable period of time.

Another object of the invention is to provide a fish stringing device to which the fish may be easily applied, on which they may be firmly and securely held, yet from which they may be conveniently removed when so desired.

An additional object of the invention is to provide a fish stringing device which is simple in construction, which will readily lend itself to economical manufacture, and which is otherwise well adapted for the purpose for which it is intended.

With the above more important objects in view and such other objects as may become apparent as this specification proceeds, the invention consists essentially of the construction and arrangement of parts as shown in the accompanying drawing in which—

Figure 1 is a perspective view of the invention, showing the same in use;

Figure 2 is a perspective view showing a modified embodiment of the invention per se;

Figure 3 is a perspective view illustrating an alternative manner in which the embodiment shown in Figures 1 and 2 may be employed;

Figure 4 is a fragmentary perspective view illustrating a further modified embodiment of the invention, and;

Figure 5 is a perspective view showing a still further modified embodiment of the same.

Like characters of reference are employed to designate like parts in the specification and throughout the several views.

Referring now to the accompanying drawing in detail, more particularly to Figure 1, the invention consists of a fish stringing device designated generally by the reference character 10, the same embodying in its construction a rod 11 which is coiled medially of its length so as to provide a loop 12, while the end portions of the rod terminate in pointed extremities 13.

A stem 14 is arcuated at one end thereof to form an eye 15 which is movably connected to the eye 12, the remaining end portion of the stem 14 providing a further eye 16.

The eye 16 is, in turn, flexibly connected to the resilient clasp 17, this simply assuming the form of a resilient wire rod arcuated to provide a coil 18 to which the eye 16 is attached. The coil 18 is extended to form a pair of arms 19 terminating in arcuate portions 20, matters being so arranged that by spreading the arms 19 apart, the clasp 17 may be applied to or removed from a ring 21 provided at one end of a link or chain, or the like, 22.

The remaining end of the chain is connected, as at 23, to the gunwale of a boat 24, or to some other suitable supporting structure, such as the dock, or the like.

A fish 25 may be applied to the stringer by simply passing the pointed end portion 13 of the rod 11 through the upper and lower lips of the mouth of the fish, whereupon the fish will be firmly and securely held in position.

Alternatively, one end portion of the rod 11 may be placed adjacent the stem 14, whereupon the rod 11 as well as the stem 14 may be passed through both lips of the fish's mouth. The rod 11 may then be permitted to assume a transverse position as indicated in Figure 3, whereby accidental or unintentional removal of the stringer from the mouth of the fish will be effectively prevented, as will be clearly apparent.

A modified embodiment of the stringing member is illustrated in the accompanying Figure 2 and is designated by the general reference character 26, the same being similar to the embodiment already described and including in its construction a rod 11 and a stem 27. The latter corresponds to the aforementioned stem 14, but in place of the clasp 17, the stem 27 is formed integrally with an elongated loop 28, whereby the stringing member may be separably connected to the ring 21.

Needless to say, the free end portion 29 of the loop 28 is of a resilient character, so that it may be separated from the main body portion on the stem 27, in order to facilitate application of the stringing member to the ring 21.

The further modified embodiment of the invention designated generally by the reference character 30 is formed entirely from resilient rods 31 which are twisted together as at 32, and crowds over each other as at 33 to form a pair of gripping jaws 34. The remaining end portions of the arms or rods 31 provide a clasp member 35 similar to the aforementioned clasp 17, whereby the stringer may be separably connected to the ring 21.

When this embodiment of the invention is placed in use, the jaws 34 may be opened by simply pressing the mid portions of the rod 31 together, whereupon the jaws may be engaged with the upper and lower lips of the fish's mouth, as will be clearly apparent from the accompanying drawing.

Finally, referring to the still further modified embodiment of the invention best illustrated in the accompanying Figure 5 and designated by the general reference character 36, the same consists of a wire rod 37, the end portions of which are arcuated to provide a pair of eyes 38 terminating in outwardly pointed extremities 39.

One of the eyes 38 may be "threaded" through the upper, lower or both lips of the fish's mouth, while the remaining eye (38) may be connected to the ring 21.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a fish stringer, the combination of a wire stem provided at one end thereof with a closed eye, and a transverse bar pointed at both ends thereof and provided intermediate its ends with a loop extending through said eye, whereby to movably connect said bar to said stem.

JOHN FRED SCHEIDT.

REFERENCES CITED

The following references are of record in the file of this patent:

UNITED STATES PATENTS

| Number | Name | Date |
|---|---|---|
| 389,598 | Roberts | Sept. 18, 1888 |
| 597,016 | Parker | Jan. 11, 1898 |
| 928,427 | Coleman | July 20, 1909 |
| 1,350,390 | Stein | Aug. 24, 1920 |
| 1,475,891 | Simpson | Nov. 27, 1923 |
| 1,489,194 | Connolly | Apr. 1, 1924 |